United States Patent [19]

Metivaud

[11] Patent Number: 5,292,575
[45] Date of Patent: Mar. 8, 1994

[54] SHEET MATERIAL FOR CONSTRUCTING HIGH PERFORMANCE THERMAL SCREENS

[75] Inventor: Guy Metivaud, Talence, France

[73] Assignee: Aerospatiale Societe Nationale Industrielle, Paris, France

[21] Appl. No.: 957,079

[22] Filed: Oct. 6, 1992

Related U.S. Application Data

[63] Continuation of Ser. No. 743,137, Aug. 9, 1991, abandoned.

[30] Foreign Application Priority Data

Aug. 21, 1990 [FR] France .................. 90 10518

[51] Int. Cl.⁵ .................. B32B 3/06; B32B 7/00; B27N 9/00; D03D 3/00
[52] U.S. Cl. .................. 428/224; 428/104; 428/266; 428/286; 428/920; 428/290; 428/300; 428/302
[58] Field of Search .............. 428/104, 224, 252, 266, 428/272, 920

[56] References Cited

U.S. PATENT DOCUMENTS

| | | | |
|---|---|---|---|
| 4,342,803 | 8/1982 | Stengle, Jr. ................. | 428/131 |
| 4,397,910 | 8/1983 | Benson et al. ................ | 428/283 |
| 4,529,644 | 7/1985 | Awano et al. ................. | 428/284 |
| 4,540,617 | 9/1985 | Kawanishi et al. ............ | 428/137 |
| 4,541,264 | 9/1985 | Awano et al. ................. | 72/257 |
| 4,618,522 | 10/1986 | Modic ........................ | 428/240 |
| 4,666,765 | 5/1987 | Caldwell et al. ............. | 428/266 |
| 4,874,662 | 10/1989 | Hahn .......................... | 428/266 |
| 4,889,576 | 12/1989 | Suganuma et al. ............. | 428/266 |
| 5,047,449 | 9/1991 | Sastureau .................... | 428/447 |

FOREIGN PATENT DOCUMENTS

| | | |
|---|---|---|
| 0079808 | 11/1982 | European Pat. Off. . |
| 150385 | 8/1985 | European Pat. Off. . |
| 355193 | 2/1990 | European Pat. Off. . |
| 2632866 | 12/1989 | France . |
| 1577771 | 10/1980 | United Kingdom . |

OTHER PUBLICATIONS

World Patent Index Latest, Accession No. 86-255989, Week 39, Derwent.

*Primary Examiner*—George F. Lesmes
*Assistant Examiner*—Kathryn E. Shelborne
*Attorney, Agent, or Firm*—Fisher, Christen & Sabol

[57] ABSTRACT

According to the invention, there is provided a heat resistant pad formed by the superimposition of a plurality of fabric layers of carbonizable oxidized organic fibers, at least one face of the said pad being covered with a silicone layer.

16 Claims, 1 Drawing Sheet

SHEET MATERIAL FOR CONSTRUCTING HIGH PERFORMANCE THERMAL SCREENS

This application is a continuation of prior U.S. application Ser. No. 07/743,137 filed on Aug. 9, 1991, now abandoned.

FIELD OF THE INVENTION

The present invention concerns a sheet material for use in constructing high performance thermal screens, and to flexible or rigid thermal screens constructed from this material and particularly suitable for ensuring protection in the case of fire.

BACKGROUND OF THE INVENTION

It is already known to make flame resistant fabrics from carbonizable oxidized organic fibers capable of strongly absorbing the thermal infra-red radiation of a fire. Such fabrics are preferably of the mesh type and the said organic fibers may be based on polyacrylonitrile. Other fibers, such as aramides are provided to facilitate the weaving. Such fabrics are, for example, made and sold under the Trade name MONTSEGUR by La Société Ariégeoise de Bonneterie, 09300 MONT-FERRIER, FRANCE.

OBJECT AND SUMMARY OF THE INVENTION

The object of the present invention is to construct high performance thermal screens taking advantage of the thermal flux absorption properties of these flame resistant fabrics.

To this end, according to the invention, a sheet material intended for use in constructing thermal screens, notably for protection against fires, comprises a pad constituted by the superimposition of a plurality of layers of fabric made from carbonizable oxydized organic fibers, at least one face of the said pad being covered with a layer of silicone.

Thus, thanks to the invention, one obtains a particularly effective thermal barrier. In fact, the said silicone layer being directed towards the heat source (fire), it decomposes under the effects of the thermal attack, the decomposition of the silicone initially absorbing the heat and finally leaving a silica residue which blocks the interstices of the fabric layers, so as to constitute a barrier against the penetration of hot gases.

Preferably, the two faces of the said pad, and advantageously its peripheral edges, are covered with a silicone layer. The thermal protection properties are thus further increased.

Experiments have been made which demonstrate the properties of the material according to the invention.

For example, two flat test pieces were made, each comprising ten superimposed layers of the same fabric made from carbonizable oxidized organic fibers. One of these test pieces was totally coated (in any known manner such as moulding, dusting or steeping) with a covering of pure silicone. Then, a face of each of the test pieces was subjected to the action of a flame at 1100° C.

For the test piece without the silicone coating, it was found that:
  the temperature of the face of the pad remote from the flame reached 100° C. in 1.5 minutes; and
  the layers of the fabric were penetrated one after the other.

On the other hand, for the test piece with the silicone covering:

the temperature of the face of the pad remote from the flame reached 100° C. in 2.5 minutes, that is to say after a time 1.8 times as long as that for the test piece without the coating;
  the layer of silicone subjected to the flame was not penetrated by the latter.

Preferably, in a pad according to the present invention, at least one of the two silicone layers covering the two faces of the pad is made of an endothermic filled siliconized product, such as that described for example in French Patent No. 2 632 866. In this way, the thermal isolation properties of the pad of the invention are improved, especially if the layer of endothermic filled siliconized product is carried by the face of the pad remote from the thermal attack.

In order to illustrate this particular feature, two flat test pieces were made, each comprising five superimposed layers of the same fabric made of carbonizable oxidized organic fibers. The first of the test pieces was coated with pure silicone, while, for the second test piece, one of the faces was coated with pure silicone and the other with endothermic filled silicone. Then, each test piece was subjected to the action of a flame at 1100° C., the pure silicone face of the second test piece being turned towards the said flame.

It was found that the temperature of the face of the pad remote from the flame reached 250° C. in 2 minutes and 54 seconds for the first test piece, and in 4.5 minutes for the second test piece. It can thus be seen that the second test piece with the layer of endothermic filled silicone disposed on the face of the pad remote from the flame absorbs the heat, while the pure silicone layer orientated towards the flame permits retarding of the combustion of the material.

In order to improve further the thermal isolation properties of the material according to the present invention, it is possible to impregnate—by any known means—at least certain of the layers of the fabric of the pad with a pure or filled silicone. In this case, the layers of fabric intended to be directed towards the heat source are advantageously impregnated with pure silicone, while those intended to be directed to the opposite side are preferably impregnated with endothermic filled silicone.

Such impregnations with silicone may serve to bond together the successive layers of fabric. However, if necessary, it is possible to join together at least certain of the fabric layers by stitching in the thickness of the pad with the aid of a refractory thread (for example silica) or a combustible thread or with the aid of spots of adhesive (for example based on silicone). It is however noted that each point of the stitching constitutes a potential passage for the hot gases and that the joining of the fabric layers by stitching is not appropriate for certain applications.

Possibly, one or more refractory fabric layers of silica or ceramic could be incorporated in the pad, preferably at the surface of the latter.

The fabrics made of carbonizable oxidized organic fibers are themselves flexible. It is thus the same for pads obtained by the superimposition of a plurality of layers of such fabrics.

However, thanks to the one or two layers of silicone covering one face or both faces of the said pad and to the impregnation of the fabric layers of the pad, one can regulate the degree of flexibility of the material according to the present invention. In fact, the flexibility of this material depends upon the thickness of the said silicone layers and the number of the fabric layers of the pad subjected to impregnation. According to the invention, one can thus obtain a material the flexibility (and thus the rigidity) of which is appropriate to the desired application.

Moreover, if required, one can mould the material of the invention into any desired form, for example into the form of a shell or hood adapted to the contour of the objects or devices to be protected.

Thus, thanks to the invention, one can construct thermal screens in the form of flexible covers adapted to objects or equipment of very varied shapes, flexible bands for wrapping around piping or electrical cabling, flexible or rigid hoods adapted to the form of particular devices etc.

The material and thermal screens according to the invention are relatively light, so that the latter are particularly—although not exclusively—suitable for use in aeronautical or space applications. They then particularly permit maintaining vital equipment at temperatures of the order of 100° C. to 200° C. for some minutes, even in the case of fires producing flames having a temperature of the order of 1000° to 1100° C.

It will be noted that the material according to the present invention, apart from its high thermal protection properties and its low mass is easy to manipulate and cut to adapt the contour of a screen to that of an object to be protected or in order to obtain strips.

These and other objects, advantages, aspects and features of the present invention will be more fully understood and appreciated upon consideration of the following detailed description of a preferred embodiment, presented in conjunction with the accompanying drawings.

DESCRIPTION OF PREFERRED EMBODIMENT

Figure 1:
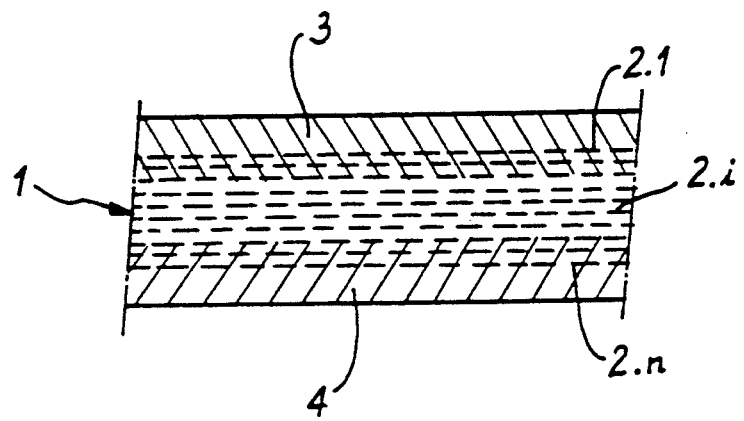
FIG. 1 shows, in a schematic enlarged cross section one particular preferred embodiment of the material according to the present invention.

Sheet material according to the invention is shown schematically in FIG. 1 as comprising a pad 1 formed by the superimposition and joining of a plurality n (for example n=15) of layers 2.1 . . . , 2.i, . . . , 2.n of fabrics made of carbonizable oxidized organic fibers.

Each layered 2.i is for example constituted of the fabric "MONTSEGUR", quality 7010, mentioned above and comprising 30% of aramide fibers and 70% of carbonizable and oxidized polyacrylonitrile fibers. The layers 2.i are connected together by adhesive spots (not shown).

On the side destined to be turned towards a heat source, for example a fire, the pad 1 is covered with a layer 3 of pure silicone, impregnating the adjacent superficial layers 2.i of the said pad 1. Similarly, on the side destined to be remote from the said heat source, the pad is covered with a layer 4 of endothermic filled silicone, equally impregnating the corresponding adjacent superficial layers of the pad 1. The endothermic filled silicone is, for example, that described in French Patent FR-A-2 632 866.

The layers 3 and 4 may be applied to the pad 1 by any known process, such as molding, steeping, dusting, etc. They may cover the peripheral edges (not shown) of the pad 1.

Thus, according to the invention, it is possible to make sheets of the material more or less flexible, as a function of the number of fabric layers 2.i impregnated by the silicone.

If the material is flexible, it may constitute protective covers. It may equally be cut into strips to serve as helical protection for elongated objects, such as pipes or cables.

Figure 2:
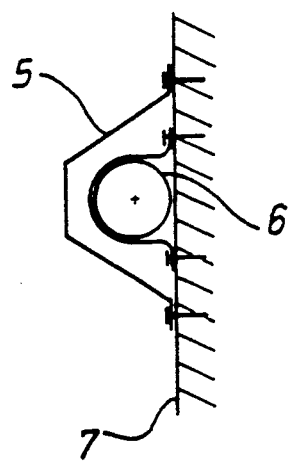
FIG. 2 shows a particular use for the material according to the present invention.

If the material is rigid after hardening of the silicone, it may be formed in a mold into the shape of protective hoods. FIG. 2 schematically shows in cross-section such a hood 5 protecting equipment 6 carried by a wall 7.

Regarding the endothermic filled silicone, a fire protection material may be used which employs simultaneously the two phenomena of intumescence and endothermicity to obtain optimal protection characteristics maintaining the element to be protected at a temperature below or in the order of 150° C. when it is subjected to thermal attack corresponding to a flame temperature of 700° to 1,000° C. for a duration of at least one hour for a thickness of the material between 10 and 20 mm. The material having these particular properties is therefore essentially characterized in that it is a flexible material comprising a binder which is a silicone elastomer and an active charge which is an intumescent agent also giving rise to an endothermic reaction in a proportion of 38 to 45 percent by weight, relative to the total weight of said material.

The silicone elastomer binder is selected from the silicone elastomers which polymerize by polycondensation and the silicone elastomers which polymerize by polyaddition. The active charge is preferably borax $Na_2B_4O_7$, 10 $H_2O$, the insulative charge is preferably of the mica or vermiculite type.

With a material of this kind it is seen that due to the action of heat (in fact as soon as the temperature reaches 100° C.), the active charge (the borax) decomposes, producing water which is vaporized and which behaves in relation to the fire protection as an intumescent agent. The vaporization of the water is an endothermic reaction, which contributes to reducing the surface temperature of the protection material.

This can only be achieved by careful choice of the constituents of the material and their proportions. In particular, the amplitude of the intumescence must be controlled and limited. It must result in a progressive but sufficient release in relation to the thermal aggression of the activity of the endothermic charge without impeding the free progress or the free manifestation of the phenomenon of intumescence. The optimal intumescence ratio must therefore be situated with advantage between 3/1 and 5/1 (by volume).

According to how the material is to be used, either a silicone elastomer which polymerizes by polycondensation or a silicone elastomer which polymerizes by polyaddition is chosen.

If the material is prepared for immediate application to the element to be protected an elastomer which polymerizes by polycondensation is preferably used, with the addition of a catalyst which is usually a tin salt such as, for example, dibutyl tin dilaurate or tin octoate, the latter advantageously procuring faster polymerization at ambient temperature.

We claim:

1. A thermal screen for protection against a fire, which screen is constructed from a sheet material comprising a pad constituted by the superimposition of a plurality of fabric layers made from carbonizable oxidized organic fibers, the face of said pad intended to be directed towards said fire being covered by a layer consisting of a silicone which decomposes under the effects of thermal attack, the decomposition ultimately leaving a silica residue which blocks the interstices of the fabric layers so as to constitute a barrier to the penetration of hot gases and the face of said pad intended to be directed away from said fire being covered with a layer of endothermic filled silicone which is a fire protection material employing simultaneously the two phenomena of intumescence and endothermicity to obtain optimal protection characteristics maintaining the element to be protected at a temperature below or about 150° C. when it is subjected to thermal attack corresponding to a flame temperature of 700° to 1000° C. for a duration of at least one hour for a thickness of the material between 10 and 20 mm, essentially characterized in that it is a flexible material comprising: a binder which is a silicone elastomer in a proportion of 30 to 35% by weight, a reinforcing charge which is a metal oxide compatible with said silicone elastomer in a proportion of 17 to 23% by weight; an active charge of borax ($Na_2B_4O_7$, 10 $H_2O$) in a proportion of 38 to 45% by weight; and an insulative charge of mica or vermiculite in a proportion of 5 to 10% by weight, these proportions being relative to the total weight of said material.

2. The thermal screen according to claim 1 wherein the peripheral edges of said pad are covered by a layer consisting of said silicone.

3. The thermal screen according to claim 1 wherein at least certain fabric layers of said pad are impregnated with silicone.

4. The thermal screen according to claim 3 wherein certain of said fabric layers of said pad are impregnated with endothermic filled silicone.

5. The thermal screen according to claim 1 wherein at least some of the fabric layers of said pad are joined together by stitches.

6. The thermal screen according to claim 1 wherein at least some of the fabric layers of said pad are joined together by spots of adhesive.

7. The thermal screen according to claim 1 wherein at least one refractory fabric layer is incorporated in the said pad.

8. The thermal screen according to claim 1 which is flexible.

9. The thermal screen according to claim 1 which is rigid.

10. The thermal screen according to claim 1 which has the form of a cover.

11. The thermal screen according to claim 1 which has the form of strips.

12. The thermal screen according to claim 1 which has the form of a moulded hood.

13. Material according to claim 1 wherein the carbonizable oxidized organic fibers are carbonizable oxidized polyacrylonitrile fibers.

14. Material according to claim 1 wherein the fabric is made from aramide fibers and the carbonizable oxidized organic fibers, the carbonizable oxidized organic fibers are carbonizable oxidized polyacrylonitrile fibers.

15. Screen according to claim 1 wherein the carbonizable oxidized organic fibers are carbonizable oxidized polyacrylonitrile fibers.

16. Screen according to claim 1 wherein the fabric layers are made from aramide fibers and the carbonizable oxidized organic fibers, the carbonizable oxidized organic fibers are carbonizable oxidized polyacrylonitrile fibers.

* * * * *